United States Patent
Chiu et al.

(10) Patent No.: US 6,805,739 B2
(45) Date of Patent: Oct. 19, 2004

(54) COMPONENT AND MANUFACTURE OF A PHOTO-CATALYST

(75) Inventors: Lien-Hua Chiu, Hsin-Chuang (TW); Wen-Tung Chen, Yung-Ho (TW); Jan-An Guu, Hsin-Chu (TW); Jeffrey Chi-Sheng Wu, Taipei (TW); I-Hsiang Tseng, Yun-Lin Hsien (TW); Chih-Hsien Chen, Kaohsiung (TW)

(73) Assignee: China Textile Institute, Taipei Hsien (TW)

( * ) Notice: Subject to any disclaimer, the term of this patent is extended or adjusted under 35 U.S.C. 154(b) by 0 days.

(21) Appl. No.: 10/206,180

(22) Filed: Jul. 29, 2002

(65) Prior Publication Data

US 2004/0016368 A1 Jan. 29, 2004

(51) Int. Cl.$^7$ ................................................ C04B 1/36
(52) U.S. Cl. ........................ 106/436; 106/442; 106/446
(58) Field of Search ............................. 106/434, 435, 106/436, 442, 446, 454, 482; 502/236, 239, 242, 350; 428/403–408

(56) References Cited

U.S. PATENT DOCUMENTS

| 5,618,872 A | * | 4/1997 | Pohl et al. .................. 524/430 |
| 5,886,069 A | * | 3/1999 | Bolt ............................ 523/223 |
| 6,534,044 B1 | * | 3/2003 | Wada et al. .................. 424/59 |

* cited by examiner

Primary Examiner—C. Melissa Koslow
Assistant Examiner—Shalie Manlove
(74) Attorney, Agent, or Firm—Rosenberg, Klein & Lee

(57) ABSTRACT

A method of manufacturing a photo-catalyst including titanium dioxide and silicon dioxide is provided, wherein titanium dioxide is synthesized by a collosol gelatinization utilizing the water generated by the esterification of acid and alcohol to conduct a reaction of hydrolysis condensation. The silicon dioxide is synthesized by a collosol gelatinization by adding $Si(OC_2H_5)_4$, $n-C_4H_9OH$ and water or $Si(OC_2H_5)_4$, $(CH_3)Si(OC_2H_5)_3$ and water.

3 Claims, 3 Drawing Sheets

COMPONENT AND MANUFACTURE OF A PHOTO-CATALYST

BACKGROUND OF THE INVENTION

1) Field of the Invention

The present invention aims to provide a component and a method of manufacturing a photo-catalyst. More especially, to provide a photo-catalyst with a component excellent in antifouling, sterilization, deodorization and can be applied to manufacturing raw material for textile fibers and coating textile products so as to make the manufactured textile products capable of antifouling, sterilizing and deodorizing.

2) Description of the Prior Art

A photo-catalyst is a general term of photo-semiconductor materials with photo-catalysis capability and is represented by titanium dioxide; under the irradiation of the ultraviolet light, this kind of material generates free electrons and electronic holes; after contacting with steam and oxygen in the air, free radicals are generated to have very strong photo oxidation-reduction capability for oxidizing and decomposing all kinds of organic compounds, destroying cell membranes and solidifying protein in viruses; it has extreme functions of antifouling, sterilization and deodorization. Usually, the general photo-catalyst (titanium dioxide) is manufactured by vaporizing titanium tetra chloride material at high temperature for oxidizing its gas phase; however, this kind of synthetic method is unable to produce very fine photo-catalyst powder of nano level. In order to manufacture photo-catalyst powder of nano level, inorganic metal alkoxides are usually used for sol-gel procedure. For this kind of synthesis, water has to be added to conduct a reaction of hydrolysis condensation. However, due to the over-speedy hydrolytic condensation of the inorganic metal alkoxides, larger particles of titanium dioxide are often formed to result in particle precipitation that fails the manufacture of suspension liquid with very fine powdery particles and that is the major shortcoming of the generation of photo-catalyst.

Furthermore, to apply photo-catalyst to textile products, the method of mixing in fiber and coating is usually utilized for affixing the photo-catalyst onto the fiber. The photo-catalyst powder had not been protected through special structure; the fiber or the adhesive might crack and become unable to be applied to textile products.

In view of the abovementioned shortcomings of the photo-catalyst, the inventor of the present invention researched and invented a component and a method of manufacturing a photo-catalyst with more practicability and wider applicative areas to meet the industrial utilization value of textile products.

SUMMARY OF THE INVENTION

The component of the photo-catalyst of the present invention comprises titanium dioxide and silicon dioxide, wherein titanium dioxide is synthesized by sol-gel method via utilizing the esterification of alcohol and acetic acid to slowly release water molecule, thereby to reduce the speed of the hydrolysis of the titanium oxide for manufacturing clear sol-gel dispersed evenly with fine particles therein; then the porous silicon sol-gel is used to cover the surface of titanium dioxide to make the molecule of titanium dioxide not directly contact the polymer and allow the odor molecule to dissipate into the pores to be occluded onto the surface of titanium dioxide for conducting photo-catalysis; furthermore, the most special feature of the present invention is that a special structure of silane oxidized compounds is used to increase the porous structure of silicon dioxide on the surface of titanium dioxide for increasing the activity of the photo-catalyst so as to be efficiently applied to organic material and textile products.

The primary objective of the present invention is to provide a component and a method of manufacturing fine particles of a photo-catalyst, more especially, to provide a photo-catalyst with a component excellent in antifouling, sterilization, deodorization and can be efficiently applied to manufacturing raw material for textile fibers and coating textile products so as to make the manufactured textile products capable of antifouling, sterilizing and deodorizing.

To enable a further understanding of the objective, features and the functions of the present invention, the brief description of the drawings below is followed by the detailed description of the preferred embodiment.

DETAILED DESCRIPTION OF THE PREFERRED EMBODIMENTS

Figure 1:
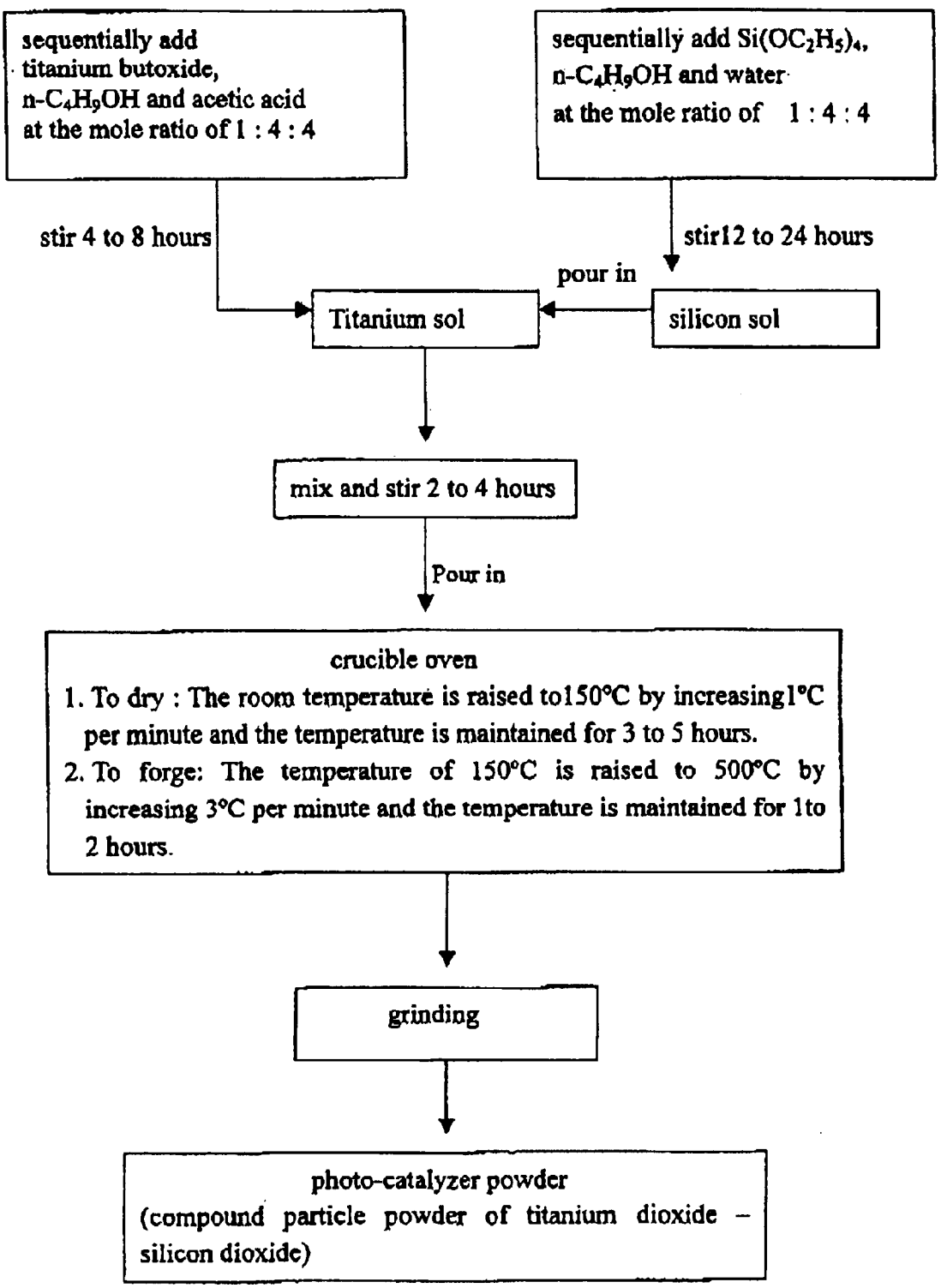
FIG. 1 is a flowchart of manufacturing a photo-catalyst of the present invention.

The present invention is of a component and a method of manufacturing a photo-catalyst, wherein the said photo-catalyst component comprises titanium dioxide and silicon dioxide; the detail manufacturing process thereof indicated in FIG. 1 is as follows:

First, titanium solution and silicon sol are disposed respectively in a glove box with a constant temperature at 25° C. and a humidity at 40%; the manufacturing of the said titanium sol is to sequentially add tetra butyl alcohol, titanium oxide, n-$C_4H_9OH$ and acetic acid at the mole ratio of 1:4:4; after agitating for four to eight hours, titanium gel is obtained; the disposition of the silicon sol is to add $Si(OC_2H_5)_4$, n-$C_4H_9OH$ and water at the mole ratio of 1:4:4 to be agitated for twelve to twenty-four hours to obtain silicon gel; then the silicon sol is poured into the titanium gel to be mixed and agitated for two to four hours; after that, the mixture is poured into a crucible to be forged at high temperature; air is sent in to raise the room temperature in the oven up to 150° C. by increasing 1° C. per minute and the temperature thereof is maintained for three to five hours; then, the temperature of 150° C. is raised up to 500° C. by increasing 3° C. per minute and the temperature thereof is maintained for one to two hours; then, the product is taken out for grinding thereby to obtain photo-catalyst sample B (compound particle powder of titanium dioxide—silicon dioxide).

Figure 2:
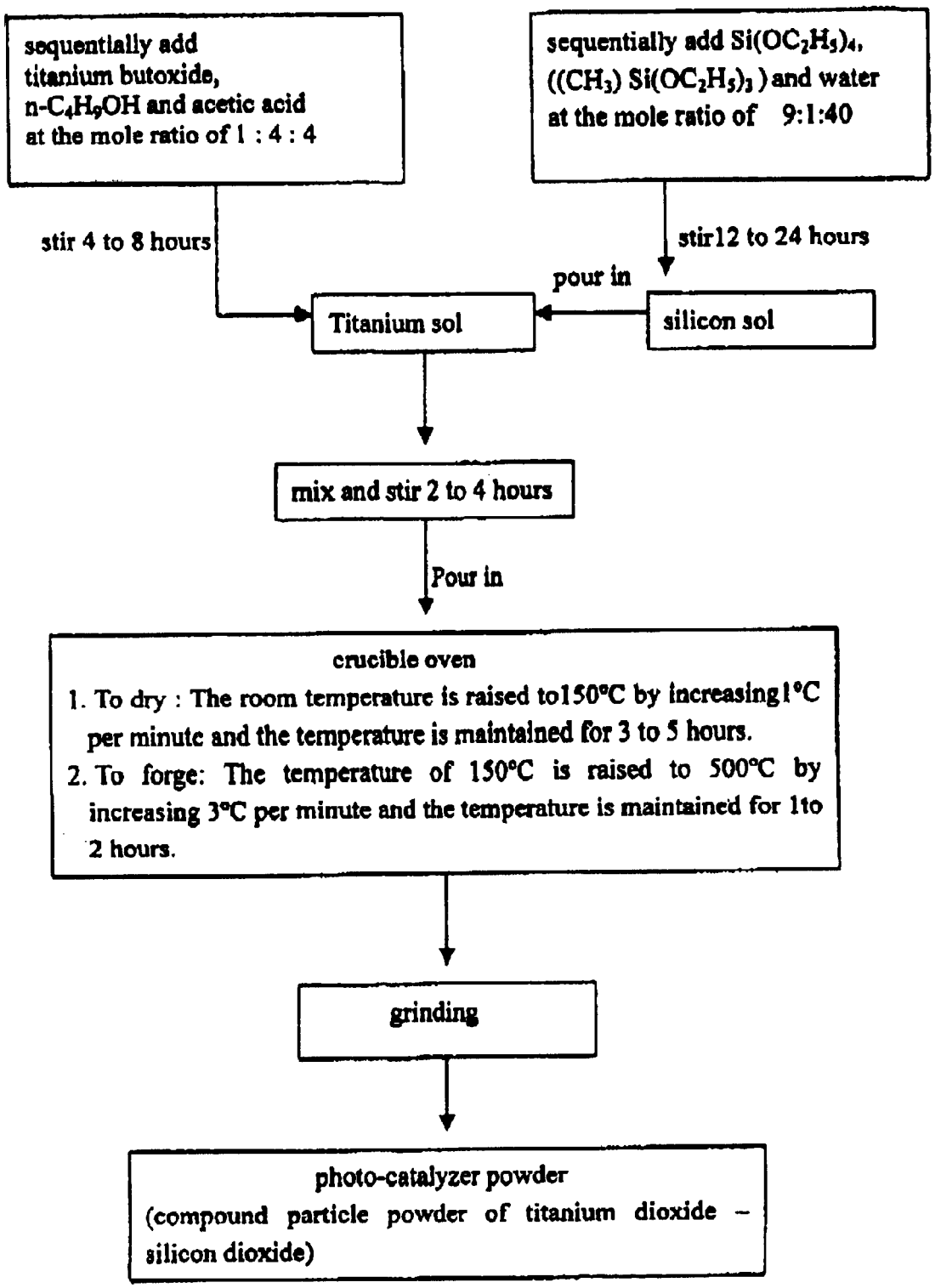
FIG. 2 is another flowchart of manufacturing a photo-catalyst of the present invention.

FIG. 2 indicates the manufacturing of another state of photo-catalyst particle; first titanium sol and silicon sol are disposed respectively in a glove box with a constant temperature at 25° C. and a humidity at 40%; the manufacturing of the said titanium sol is to sequentially add titanium buoxide, n-$C_4H_9OH$ and acetic acid at the mole ratio of 1:4:4; after agitating for four to eight hours, titanium gel is obtained; the disposition of the silicon sol is to add $Si(OC_2H_5)_4$, $(CH_3)Si(OC_2H_5)_3$ and water at the mole ratio of 9:1:40 to be agitated for twelve to twenty-four hours to obtain silicon gel; then the silicon gel is poured into the titanium gel to agitated for two to four hours; after that, the mixture is poured into a crucible to be forged at high temperature; air is sent in to raise the room temperature in the oven up to 150° C. by increasing 1° C. per minute and the temperature thereof is maintained for three to five hours; then, the temperature of 150° C. is raised up to 500° C. by increasing 3° C. per minute and the temperature thereof is maintained for one to two hours; after that, the product is taken out for grinding thereby to obtain a photo-catalyst sample C (compound particle powder of titanium dioxide—silicon dioxide).

The manufacturing of another state of photo-catalyst particle; first titanum sol and silicon sol are disposed respectively in a glove box with a constant temperature at 25° C. and a humidity at 40%; the manufacturing of the said titanium sol is to sequentially add titanium n-butoxide, n-$C_5H_{11}$OH and butanoic acid at the mole ratio of 1:4:4; after agitating for four to eight hours, titanium gel is obtained; the disposition of the silicon sol is to add $Si(OC_2H_5)_4$, $(CH_3)Si(OC_2H_5)_3$ and water at the mole ratio of 9:1:40 to be agitated for twelve to twenty-four hours to obtain silicon gel; then the silicon gel is poured into the titanium gel to agitated for two to four hours; after that, the mixture is poured into a crucible to be calcined at high temperature; air is sent in to raise the temperature in the oven from room temperature up to 150° C. and the temperature thereof is maintained for one to five hours; then, the temperature of 150° C. is raised up to 500° C. and the temperature thereof is maintained for one to five hours; after that, the product is taken out for grinding thereby to obtain a photo-catalyst sample C (compound particle powder of titanium dioxide-silicon dioxide).

Figure 3:
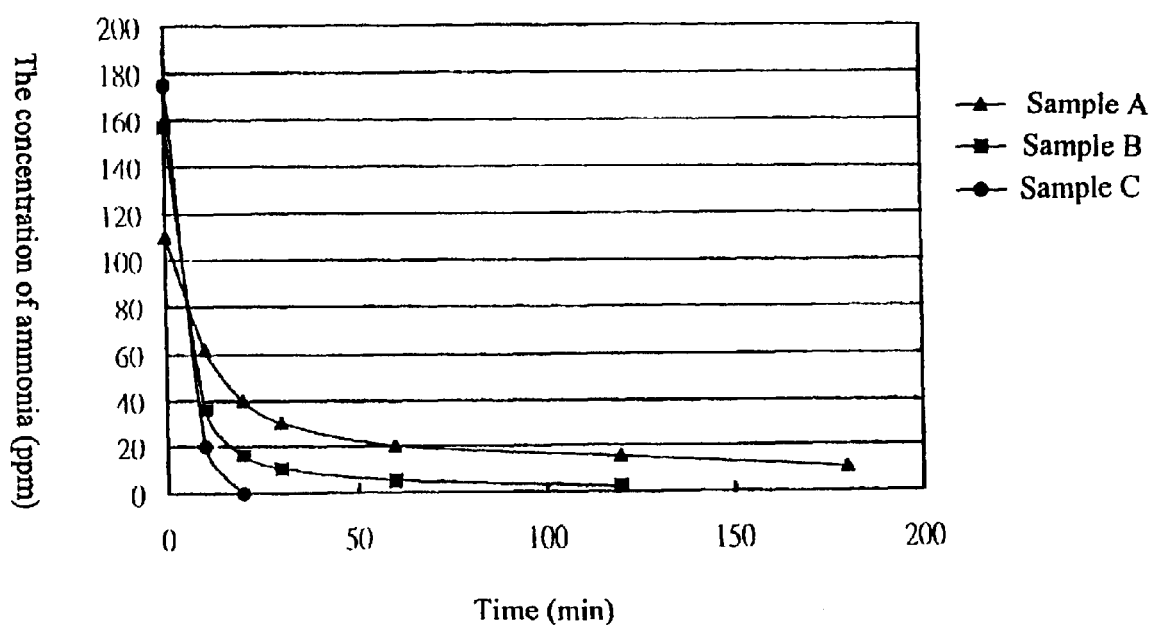
FIG. 3 is a line graph of the comparison among the photo-catalyst sample C, D of the present invention and a photo-catalyst sample A available on the market.

Furthermore, according to the abovementioned, the photo-catalyst (samples B and C) of the present invention and a titanium dioxide photo-catalyst ST-01 (photo-catalyst sample A) purchased from a common market and with a particle diameter of 7 nm and specific surface area of 300 m$^2$/g are used to conduct a comparative experiment (of ammonia decomposition) of the deodorizing effect of photo-catalyst; the steps involved are that first, a low pressure mercury lamp is used as a source of ultraviolet light with wavelength of 365 nm and strength of 0.68 mW/cm$^2$; sample of 0.2 g is taken to be placed in the quartz glass of 500 ml; then, the said glass is filled with ammonia and sealed; a testing tube is used to measure the concentration thereof and the sample is placed under the irradiation of the ultraviolet light source; during the irradiation, the concentration of the said ammonia with volume of pmp is measured periodically at a certain time; the result of the test is shown in FIG. 3; as indicated, the photo-catalyst samples C and B of the present invention have better deodorizing effect than that of sample A of the photo-catalyst available on the market.

In summation of the abovementioned, the present invention of photo-catalyst powder has the following advantages:

1. The components of the photo-catalyst of the present invention are photo-catalyst fine particles with very short particle diameters.
2. The components of the photo-catalyst of the present invention have photo-catalyst activity and can be efficiently applied to organic material and textile products.
3. The process of manufacturing the components of the photo-catalyst of the present invention is simple and doesn't require excessive equipment for operation so as to facilitate future mass production.

Therefore, the components and the method of manufacturing the photo-catalyst of the present invention is practical, innovative and improved. It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A manufacturing method of a photo-catalyst, comprising the steps of:
   (a) manufacturing titanium collosol in a glove box by sequentially adding tetra butyl alcohol, titanium oxide, n-$C_4H_9$OH and acetic acid at a mole ratio of 1:4:4, and agitating for four to eight hours;
   (b) forming silicon collosol in the glove box by adding $Si(OC_2H_5)_4$, n-$C_4H_9$OH and water at a mole ratio of 1:4:4, and agitating for twelve to twenty-four hours;
   (c) pouring the silicon collosol into the titanium collosol to be mixed and agitated for two to four hours;
   (d) forging the mixture of step (c) at high temperature in an oven, the oven's temperature being raised to 150° C. at a rate of 1° C. per minute and maintained thereat for three to five hours, the temperature then being raised to 500° C. at a rate of 3° C. per minute and maintained thereat for one to two hours; and,
   (e) grinding the forged mixture to obtain a powder of the photo-catalyst.

2. A manufacturing method of a photo-catalyst, comprising the steps of:
   (a) manufacturing titanium collosol in a glove box by sequentially adding tetra butyl alcohol, titanium oxide, n-$C_4H_9$OH and acetic acid at a mole ratio of 1:4:4, and agitating for four to eight;
   (b) forming silicon collosol in the glove box by adding $Si(OC_2H_5)4$, $(CH_3)Si(OC_2H_5)_3$ and water at a mole ratio of 9: 1:40, and agitating for twelve to twenty-four hours;
   (c) pouring the silicon collosol into the titanium collosol and agitating for two to four hours;
   (d) forging a product of step (c) in a crucible at high temperature in an oven, the oven's temperature being raised to 150° C. at a rate of 1° C. per minute and maintained thereat for three to five hours, the temperature then being raised to 500° C. at a rate of 3° C. per minute and maintained thereat for one to two hours; and,
   (e) grinding the forged product to obtain a powder of the photo-catalyst.

3. The method of manufacturing a photo-catalyst according to claim 1 or 2, further comprising the step of setting a temperature in said glove box to 25° C. and a humidity therein to 40%.

* * * * *